W. R. WILSON.
GAGGING APPLIANCE.
APPLICATION FILED OCT. 5, 1920.
1,398,616.
Patented Nov. 29, 1921.
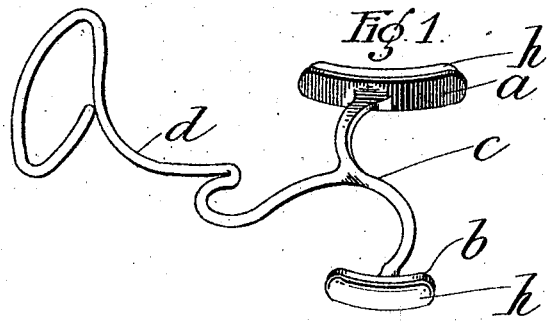
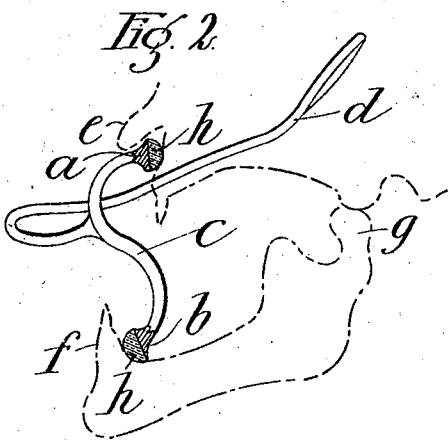
Inventor.
Walter R. Wilson
By Julian C Dowell
his attorney

UNITED STATES PATENT OFFICE.

WALTER REGINALD WILSON, OF DONCASTER, ENGLAND.

GAGGING APPLIANCE.

1,398,616.         Specification of Letters Patent.    Patented Nov. 29, 1921.

Application filed October 5, 1920. Serial No. 414,850.

*To all whom it may concern:*

Be it known that I, WALTER REGINALD WILSON, a subject of the King of Great Britain and Ireland, residing at Doncaster, in the county of York, England, have invented Improvements in or Relating to Gagging Appliances, of which the following is a specification.

As is now well recognized in the profession, during anesthesia the lower jaw of the patient should be advanced in a forward direction while the mouth is open, but at present no mechanical means exist for this purpose so that, even if a gag be employed the administrator's fingers or thumb must be relied on to exert the requisite pressure directly upon the jaw. With certain and especially stout subjects this procedure, then all the more needful, is a difficult and tiring one, so that the object of the present invention is to provide an improved device which will enable the same to be achieved with greater facility.

In its simplest form there need be no moving parts whatever, the device comprising a member which when the mouth is open can be inserted behind the upper lip and to the rear of the lower jaw, a portion of such member being arranged to protrude through the mouth so that by exerting an upward pressure thereon, the member finds an abutment against the front teeth and gum of the upper jaw such that the other end will react against and advance the lower jaw.

Such a lever-like device may be made of metal, for example, the upper end being suitably curved and padded to bear uniformly over a relatively large extent of the gum and teeth of the upper jaw. The opposite end of the device may be narrower and adapted to bear upon the lower jaw at the center, on the inside. A rigid handle extends from a point intermediate of the length of the device, say at or near the center thereof, such handle occupying a position deemed most suitable for hand control, being directed laterally.

In the accompanying drawings Figure 1 is a perspective view of one form of device according to the invention. Fig. 2 is a diagrammatic view illustrating the method of using such device.

As shown in Fig. 1 the device comprises a curved upper bar $a$ and a lower bar $b$ which may be of shorter length both united by a double curved stem $c$ to which is attached a handle $d$. Such a device is used as shown in Fig. 2, the bar $a$ being arranged behind the upper lip $e$ and in front of the upper teeth and gum while the lower bar $b$ is disposed behind the gum and teeth of the lower mandible $f$ the auricular end $g$ of which can therefore be slid forward as shown. The bars $a$ and $b$ can both be covered with any suitable material such as rubber $h$ so as to form a comfortable pad.

It will thus be seen that by means of my device, a torque can be transmitted through the handle $d$ to the stem $e$ at a point between the upper bar $a$ and lower bar $b$, an arrangement which leaves the upper and lower parts of the face at all times free and hence in no way interfering with the application to the patient of an ordinary inhaler after the gagging device has been placed in position.

The device may be made adjustable and is capable of performing all the usual functions of a gag although I desire it to be understood that the invention can also be employed as an auxiliary to any ordinary form of gag, if preferred.

The adjustability referred to may be effected by providing the lower bar $b$ with a screw threaded pin $n$ adapted to be turned within a socket $c'$ upon the stem $c$ so that it can be altered in position.

What I claim is:—

1. A device of the character referred to, comprising a member adapted to be inserted behind the upper lip, a member adapted to be inserted behind the teeth and gum of the lower jaw, a stem connecting said members so as to hold the mouth open and a laterally directed handle connected to the stem intermediate of its length so that a torque can be transmitted thereto at a point between the two members, the handle leaving the upper and lower part of the face free for the subsequent application thereto of an inhaler.

2. A device of the character described comprising a pair of padded members adapted to react respectively against the upper jaw directly in front of the teeth and gum and the lower jaw behind the teeth and gum, a double curved stem connecting said padded members and a laterally directed handle connected to the stem intermediate of its length so that a torque can be transmitted thereto at a point between the two members, the handle leaving the upper and lower parts of the face free for the subsequent application thereto of an inhaler, substantially as described.

Signed at Scarborough in the county of York England this twelfth day of August, 1920.

WALTER REGINALD WILSON.